INVENTOR.
HAROLD C. ROSE

Nov. 29, 1949     H. C. ROSE     2,489,981
SEAT SUSPENSION FOR ALL IMPLEMENTS
Filed March 20, 1946     2 Sheets-Sheet 2

INVENTOR.
HAROLD C. ROSE
BY
Victor J. Evans & Co.
ATTORNEYS

Patented Nov. 29, 1949

2,489,981

UNITED STATES PATENT OFFICE 2,489,981

SEAT SUSPENSION FOR ALL IMPLEMENTS

Harold C. Rose, Sturgis, S. Dak.

Application March 20, 1946, Serial No. 655,741

1 Claim. (Cl. 155—121)

The invention relates to a seat support, and more especially to a shock absorbing suspension or supporting means for implements or machinery seats.

The primary object of the invention is the provision of a structure of this character, wherein a seat of an implement when occupied will be relieved at the side of shock common to almost all implement seats, and in this manner giving greater comfort to the occupant when the implement is in service and thus minimizing shocks and jars to the rider incident to the travel of the said implement.

Another object of the invention is the provision of a structure of this character, wherein the seat of an implement of the riding type will be maintained in a normal position, irrespective of the irregular movement of such implement and thereby taking away the sudden side shock from an operator thereof, the seat being under spring tension at all times and especially when subjected to shocks and jars incident to the implement when in motion.

A further object of the invention is the provision of a structure of this character which is simple in construction, thoroughly reliable and efficient in operation, strong, durable, novel in construction and unique in the arrangement of its parts, readily and easily installed on an implement for servicing the same and inexpensive to manufacture and install.

With these and other objects in view the invention consists in the features of construction, combination and arrangement of parts as will be hereinafter more fully described, illustrated in the accompanying drawings, which disclose the preferred and modified forms of construction thereof, and pointed out in the claims hereunto appended.

In the accompanying drawings.

Similar reference characters indicate corresponding parts throughout the several views in the drawings.

Figure 1:
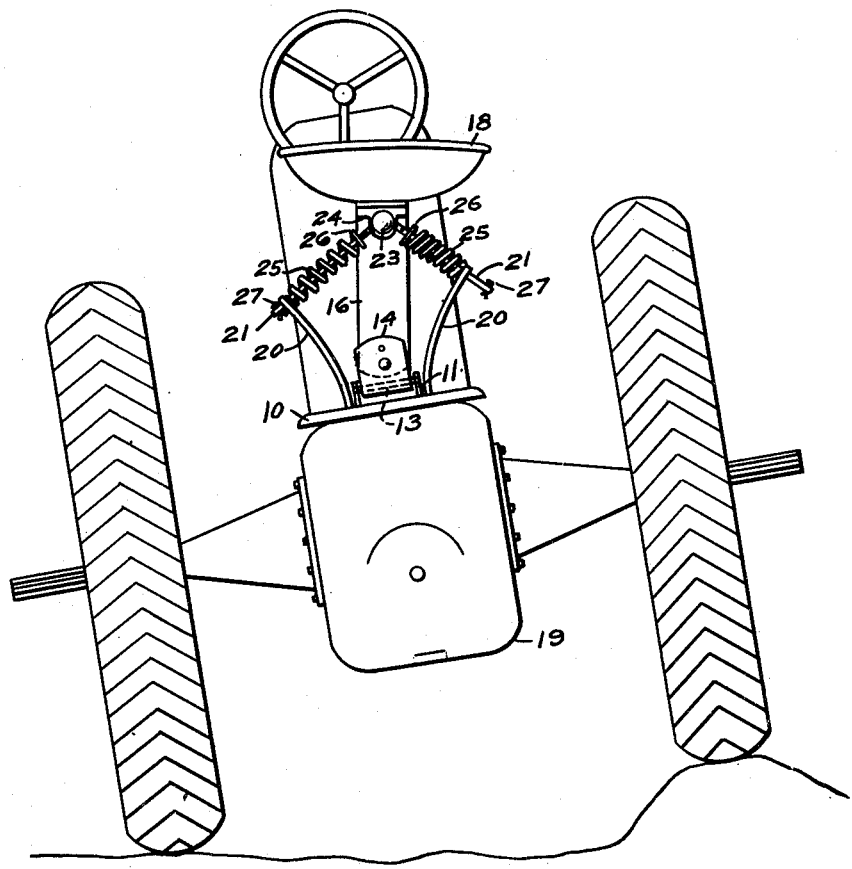
Figure 1 is an elevation of a riding implement, showing the structure in accordance with the invention applied thereto.
Figure 2:
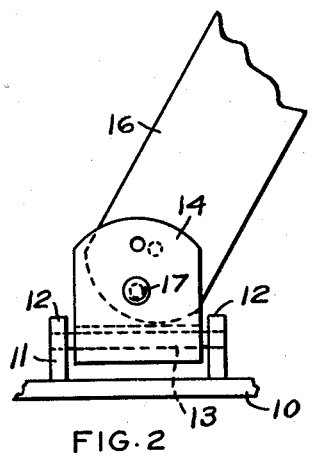
Figure 2 is a fragmentary elevation, showing the standard of the seat and mounting thereof on an enlarged scale when the implement is subjected to side thrust.
Figure 3:
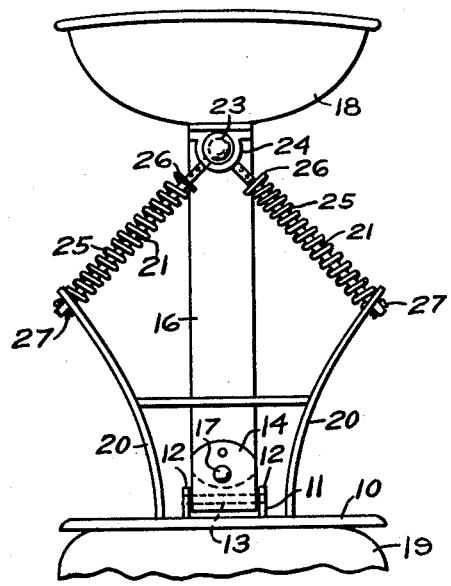
Figure 3 is a fragmentary view similar to Figure 1 showing the seat in normal position.

Referring to the drawings in detail, particularly Figures 1 to 3, inclusive, the structure constituting the present invention, comprises a base or platform 10, which may be of any approved form and arrangement having rising therefrom a substantially U-shaped bearing 11, its pivot ears 12 upstanding therefrom in spaced relation to each other for accommodating a horizontal pivot or hinge pintle 13 to which is fitted a hinging shackle 14, so that the latter can swing backwardly and forwardly. This shackle 14 has arranged in a bifurcation 15 therein the lower end of a seat standard 16 which is connected by a pivot 17 to such shackle for swinging movement at substantially right angles to the pivotal axis of the shackle at the pivot or pintle 13.

The upper end of the standard 16 has fixedly connected thereto a rider's seat 18 for the implement denoted generally at 19 and may be of any type, it being no part of the essence of the present invention.

Figure 4:
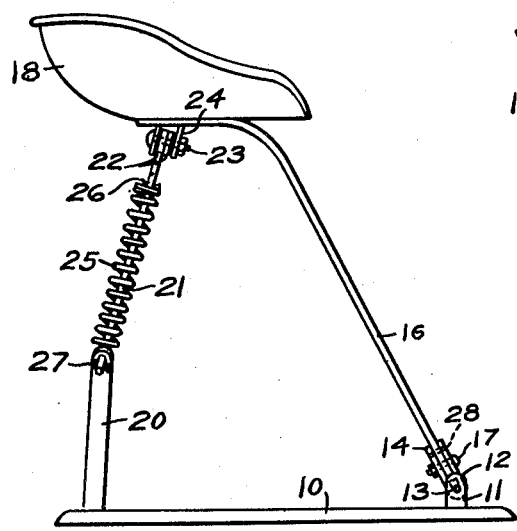
Figure 4 is a side view of a slight modification.

Upstanding from the base or platform 10 rearwardly to and at laterally opposite sides with relation to the standard 16 are upwardly and outwardly flared reversely disposed brackets 20 having in their upper ends clearances for plunger links 21 which upwardly converge toward each other with the upper ends forming eyes 22 for a pivot 23 carried in a coupling bearing 24 fixed to the under portion of the upper end of the standard 16 as best seen in Figures 1, 3 and 4 of the drawings.

About these links 21 are coiled compression springs 25 each interposed between the bracket 20 next thereto and a cotter pin 26 remote from the latter, the ends of the links 21 outside of the brackets 20 being fitted with cotter pins 27 so that such links cannot separate from the said brackets. These springs under normalcy sustain the seat standard 16 in a perpendicular position, which is also maintained when lateral shocks and jars are imparted thereto due to the side tilt of the implement in the travel thereof, as illustrated in Figure 1 of the drawings. The links 21 are adapted for free sliding movement through the brackets 20 when the seat is subjected to sudden side thrusts and the springs 25 absorbing the shocks and jars of the implement and relieving the same from said seat 18 as should be apparent.

Figure 5:
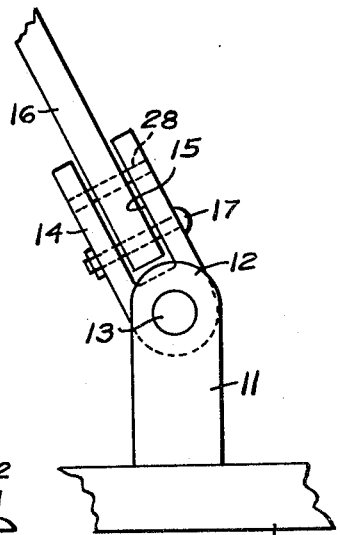
Figure 5 is a fragmentary view similar to Figure 4 and on an enlarged scale.

In Figures 4 and 5 of the drawings there is shown a slight modification of the invention wherein a locking key 28 engages the standard and shackle together to hold the said standard against lateral swinging motion, yet allowing the said standard to swing forwardly and backwardly with relation to the implement and at the same time tensioned by the springs for shock-absorbing purposes.

What is claimed is:

In a ground vehicle adapted to travel over varying terrain, the combination of a hinge pintle, bearing means on the ground vehicle mounting said hinge pintle transversely to the longitudinal axis of the ground vehicle, a hinging shackle rotatably mounted on said hinge pintle for oscillation thereon, a seat standard having a lower and an upper end portion, an operator's seat secured to the upper end portion of said seat standard, means pivoting the lower end portion of said seat standard to said hinging shackle for oscillation about an axis in the vertical plane of the longitudinal axis of the ground vehicle whereby said operator's seat is universally mounted relative to the vehicle, separated brackets on the vehicle and spaced a predetermined distance from said hinge pintle along axes parallel to the longitudinal axis of the vehicle, a link pivot means secured to the upper end portion of said seat standard, plunger links pivoted on said link pivot means said plunger links having the free ends thereof slidably engaging said brackets, respectively, and spring means on said links yieldingly resisting sliding movement between said links and respective brackets.

HAROLD C. ROSE.

REFERENCES CITED

The following references are of record in the file of this patent:

UNITED STATES PATENTS

| Number | Name | Date |
| --- | --- | --- |
| 666,802 | Ford | Jan. 29, 1901 |
| 1,746,938 | Hawkins | Feb. 11, 1930 |
| 2,284,352 | Zank | May 26, 1942 |
| 2,409,714 | Silhan | Oct. 22, 1946 |